United States Patent
Wu et al.

(10) Patent No.: US 7,680,089 B2
(45) Date of Patent: Mar. 16, 2010

(54) DYNAMIC CHANNEL ASSIGNMENT AND CONNECTIVITY MAINTENANCE IN WIRELESS NETWORKS

(75) Inventors: Haitao Wu, Redmond, WA (US); Kun Tan, Redmond, WA (US); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 11/560,680

(22) Filed: Nov. 16, 2006

(65) Prior Publication Data

US 2008/0117864 A1    May 22, 2008

(51) Int. Cl.
*H04Q 1/00* (2006.01)
(52) U.S. Cl. .................. 370/338; 370/328; 370/329
(58) Field of Classification Search .......... 370/254, 370/255, 310, 311, 328, 329, 336, 345, 346, 370/350, 386; 455/41.2, 552.1, 426.1, 429
See application file for complete search history.

(56) References Cited

U.S. PATENT DOCUMENTS

| | | | |
|---|---|---|---|
| 6,112,092 | A | 8/2000 | Benveniste |
| 6,366,780 | B1 | 4/2002 | Obhan |
| 6,687,239 | B1 | 2/2004 | Koprivica |
| 6,721,290 | B1 | 4/2004 | Kondylis et al. |
| 6,842,430 | B1 | 1/2005 | Melnik |
| 6,865,371 | B2 | 3/2005 | Salonidis et al. |
| 6,907,243 | B1 | 6/2005 | Patel |
| 6,917,811 | B2 | 7/2005 | Kim et al. |
| 6,961,310 | B2 | 11/2005 | Cain |
| 6,963,747 | B1 | 11/2005 | Elliott |
| 6,977,912 | B1 | 12/2005 | Porter et al. |
| 7,031,293 | B1 | 4/2006 | Srikrishna et al. |
| 2003/0054818 | A1* | 3/2003 | Bahl et al. .................. 455/432 |
| 2004/0014491 | A1 | 1/2004 | Weigand |
| 2004/0063401 | A1 | 4/2004 | Meckelburg et al. |
| 2004/0090924 | A1 | 5/2004 | Giaimo et al. |
| 2004/0157613 | A1 | 8/2004 | Steer et al. |
| 2004/0166853 | A1 | 8/2004 | Takeda et al. |
| 2005/0053007 | A1 | 3/2005 | Bernhardt et al. |
| 2005/0063313 | A1 | 3/2005 | Nanavati et al. |
| 2005/0125302 | A1 | 6/2005 | Brown et al. |
| 2005/0180444 | A1 | 8/2005 | Gu et al. |
| 2005/0208949 | A1 | 9/2005 | Chiueh |
| 2005/0271006 | A1 | 12/2005 | Chari et al. |
| 2005/0286426 | A1 | 12/2005 | Padhye et al. |
| 2006/0023677 | A1 | 2/2006 | Labrador et al. |

(Continued)

OTHER PUBLICATIONS

Bahl, et al., "SSCH: Slotted Seeded Channel Hopping for Capacity Improvement in IEEE 802.11 Ad-Hoc Wireless Networks", MobiCom '04, ACM, 2004, pp. 216-230.

(Continued)

*Primary Examiner*—Jean A Gelin
(74) *Attorney, Agent, or Firm*—Lee & Hayes, PLLC

(57) ABSTRACT

Dynamic channel assignment and connectivity maintenance in wireless networks may involve switching channels while maintaining connectivity in wireless ad hoc networks. In a described implementation, a wireless network may be separated into two or more respective virtual wireless networks with respective wireless node subsets operating on respective channels. Connectivity may nevertheless be maintained when a wireless node on one channel is to send a communication to another wireless node on another wireless channel. In another described implementation, monitored network information may be shared among wireless nodes by broadcast.

18 Claims, 8 Drawing Sheets

U.S. PATENT DOCUMENTS

| | | |
|---|---|---|
| 2006/0089150 A1 | 4/2006 | Agin |
| 2006/0281467 A1 | 12/2006 | Kim et al. |
| 2006/0285514 A1* | 12/2006 | Hoerl et al. .................. 370/328 |
| 2007/0201381 A1* | 8/2007 | Ekl et al. .................... 370/254 |
| 2008/0205317 A1* | 8/2008 | Piipponen et al. ........... 370/311 |

OTHER PUBLICATIONS

Battiti, et al., "Distributed Saturation Degree Methods for Code Assignment in Multihop Radio Networks", WSDAAL2000, Ischia(NA), Sep. 18-20, 2000, 3 pages.

Draves, et al., "Routing in Multi-Radio, Multi-Hop Wireless Mesh Networks", MobiCom, ACM, Sept. 26-Oct. 1, 2004, 15 pages.

Muqattash, et al., "CDMA-Based MAC Protocol for Wireless Ad Hoc Networks", ACM, 2003, pp. 153-164.

So, et al., "Multi-Channel MAC for Ad Hoc Networks: Handling Multi-Channel Hidden Terminals Using a Single Transceiver", MobiHoc '04, ACM, 2004, pp. 222-233.

So, et al., "Routing and Channel Assignment in Multi-Channel Multi-Hop Wireless Networks with Single-NIC Devices", University of Illinios, Technical Report, Dec. 2004, 12 pages.

Wu, et al., "A New Multi-Channel MAC Protocol with On-Demand Channel Assignment for Multi-Hop Mobile Ad Hoc Networks", IEEE, 2000, pp. 232-237.

Bahl, et al., "SSCH: Slotted Seeded Channel Hopping for Capacity Improvement in IEEE 802.11 Ad-Hoc Wireless Networks", MobiCom '04, ACM, 2004, pp. 216-230.

Battiti, et al., "Distributed Saturation Degree Methods for Code Assignment in Multihop Radio Networks", WSDAAL2000, Ischia(NA), Sep. 18-30, 2000, 3 pages.

Draves, et al., "Routing in Multi-Radio, Multi-Hop Wireless Mesh Networks", MobiCom, ACM, Sep. 26-Oct. 1, 2004, 15 pages.

Muqattash, et al., "CDMA-Based MAC Protocol for Wireless Ad Hoc Networks", ACM, 2003, pp. 153-164.

So, et al., "Multi-Channel MAC for Ad Hoc Networks: Handling Multi-Channel Hidden Terminals Using a Single Transceiver", MobiHoc '04, ACM, 2004, pp. 222-233.

So, et al., "Routing and Channel Assignment in Multi-Channel Multi-Hop Wireless Networks with Single-NIC Devices", University of Illinios, Technical Report, Dec. 2004, 12 pages.

Wu, et al., "A New Multi-Channel MAC Protocol with On-Demand Channel Assignment for Multi-Hop Mobile Ad Hoc Networks", IEEE, 2000, pp. 232-237.

Raniwala, et al., "Architecture and Algorithms for an IEEE 802.11-Based Multi-Channel Wireless Mesh Network", Stony Brook University, Computer Science Department, Mar. 2005, 12 pages.

Raniwala, et al., "Centralized Channel Assignment and Routing Algorithms for Multi-Channel Wireless Mesh Networks", Mobile Computing and Communications Review, vol. 8, No. 2, Apr. 2004, pp. 50-65.

* cited by examiner

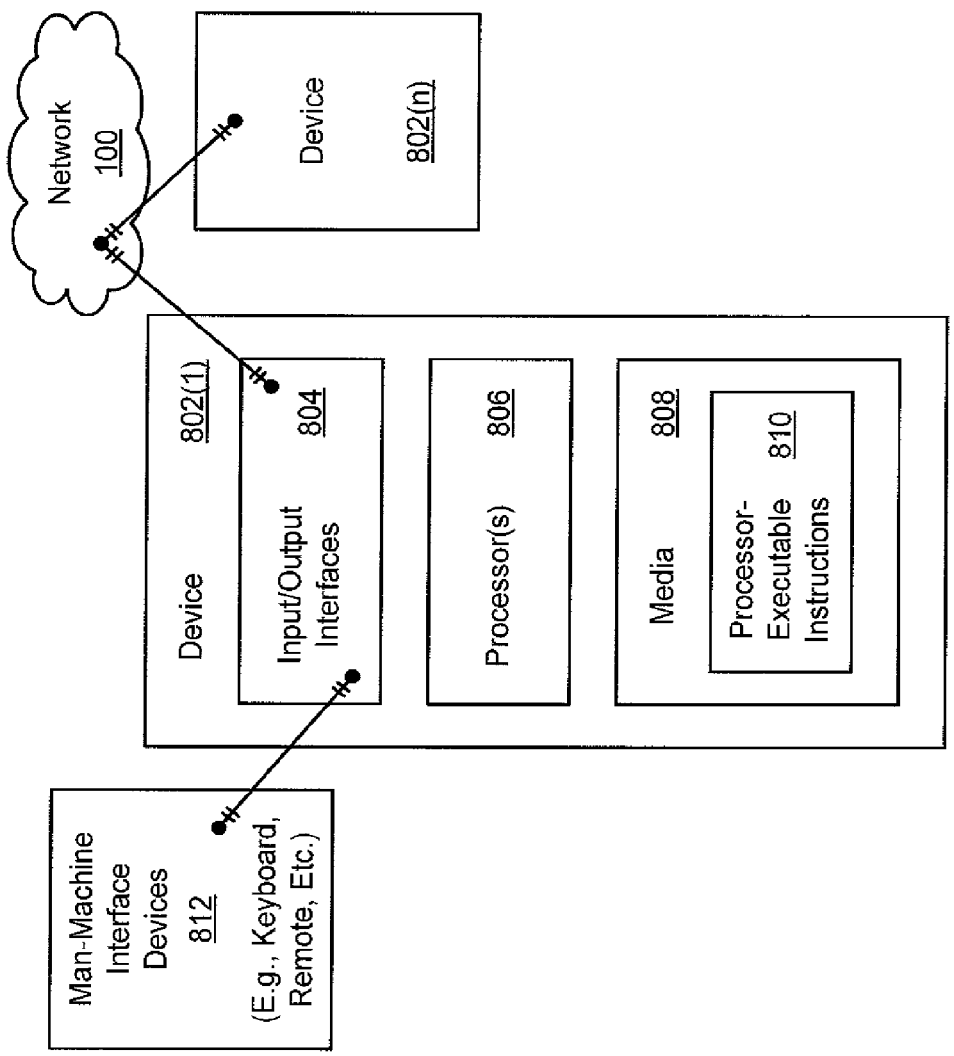

DYNAMIC CHANNEL ASSIGNMENT AND CONNECTIVITY MAINTENANCE IN WIRELESS NETWORKS

BACKGROUND

Some wireless networks are pre-planned and centrally-controlled. A single provider usually organizes all of the wireless nodes and installs the infrastructure. Operationally, a centralized managing agent has access to a wealth of knowledge about how the wireless network is functioning. Consequently, such pre-planned and centrally-controlled wireless networks can avoid or rapidly respond to the problems that typify wireless networks, such as poor signal coverage, interference, channel reuse, communication routing, and so forth.

Wireless ad hoc networks, on the other hand, do not usually involve significant pre-planning or centralized control. One or perhaps a few wireless nodes are often established by individuals. These individuals activate their respective wireless nodes, which are designed to automatically interoperate with other wireless nodes that are established by other individuals. However, these wireless nodes are designed to directly interact with only a few other wireless nodes, such as neighbor nodes. Consequently, because of a lack of higher-level coordination, ad hoc wireless networks are generally more susceptible to traditional wireless network problems.

SUMMARY

Dynamic channel assignment and connectivity maintenance in wireless networks may involve switching channels while maintaining connectivity in wireless ad hoc networks. In a described implementation, a wireless network may be separated into two or more respective virtual wireless networks with respective wireless node subsets operating on respective channels. Connectivity may nevertheless be maintained when a wireless node on one channel is to send a communication to another wireless node on another wireless channel. In another described implementation, monitored network information may be shared among wireless nodes by broadcast.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 8 is a block diagram of an example device that may be used to implement dynamic channel assignment and connectivity maintenance in wireless networks.

DETAILED DESCRIPTION

Figure 1:
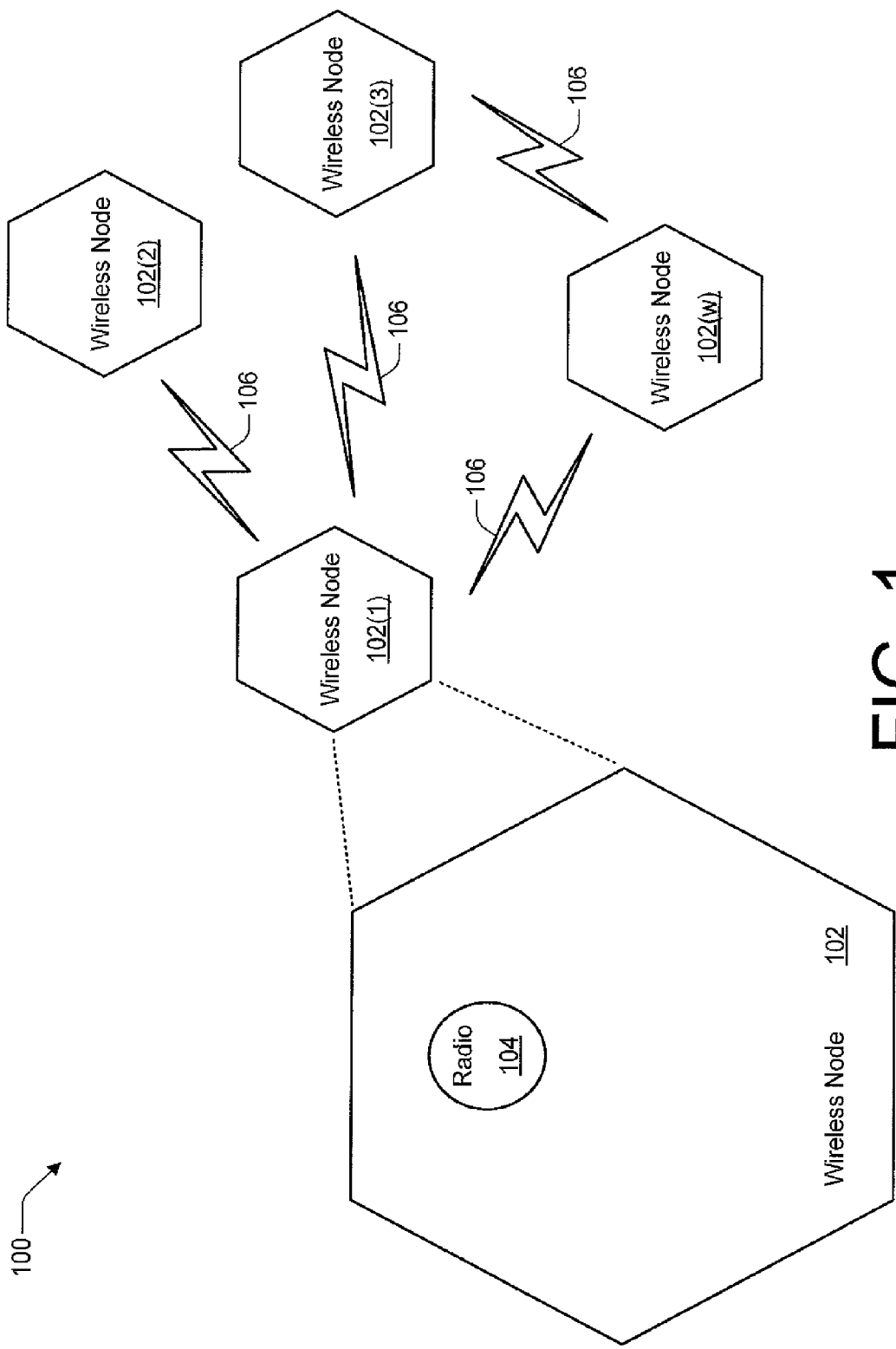
FIG. 1 is a block diagram illustrating an example of a wireless network environment.

Introduction to Dynamic Channel Assignment and Connectivity Maintenance in Wireless Networks As described herein above, because of a lack of higher-level coordination, ad hoc wireless networks are generally more susceptible to traditional wireless network problems. On the other hand, ad hoc wireless networks are generally convenient because of their self-organization feature, especially in locations in which an access point (AP) is not available or is not accessible to all relevant users.

With the increasing popularity of wireless ad hoc networks, more and more people are using them for file sharing, gaining, media streaming, and so forth. With the greater numbers of active wireless connections, however, there is performance degradation for all users. For example, a channel defined in IEEE 802.11b provides 11 Mbps of raw physical layer bandwidth, but the effective bandwidth for one TCP connection may be only about 5 Mbps because the residual bandwidth is occupied by protocol overhead from the transport layer to the MAC (Media Access Control) and PHY (Physical) layers. Consequently, the effective bandwidth provided to any one user drops greatly as the number of users grows, and the contention for access to the wireless channel accelerates the deterioration because even more bandwidth is wasted in the access conflicts.

Yet all of this traffic need not be placed on a single wireless channel. Multiple orthogonal channels are defined, e.g., in IEEE standards. For instance, there are 3 orthogonal channels for 802.11b and 13 for 802.11a. These orthogonal channels provide a capability for interference mitigation among different nearby wireless networks. However, more efficient utilization of these orthogonal channels can also conquer or at least reduce the wireless interference that widely exists within a single wireless ad hoc network.

For example, assume that there are four nodes, namely A, B C, D, in an 802.11b wireless ad hoc network working on channel 1. Also, assume that there is a TCP connection between nodes A and B. If another TCP connection is functioning between nodes C and D, then the two TCP connections contend for the wireless channel. However, if the connection between nodes C and D is moved to another orthogonal channel, such as channel 6 for 801.11b, then the two connections are not in conflict and can occupy the full bandwidth of one channel. After nodes C and D finish their transmission, they can be returned to channel 1 to maintain the overall network connectivity.

It is apparent based on this example that the multi-channel capabilities of wireless ad hoc networks can be leveraged to improve their performance. Moreover, a suitable channel assignment (CA) algorithm can be performed by each node in a dynamic and distributed way so that the resulting wireless ad hoc network retains the aforementioned self-organization feature.

There are several challenges in effectively realizing a practical distributed algorithm that considers dynamic CA in wireless ad hoc networks. Four example challenges are described below. First, for wireless nodes having only a single radio, two different wireless nodes communicating on two different orthogonal channels cannot communicate with each other. There is therefore a challenge in maintaining network connectivity when wireless nodes are communicating on orthogonal channels.

Second, for a dynamic CA algorithm, the distributed aspect may entail implementing a trigger method to make the CA decision both accurate and fast. Otherwise, existing traffic may be affected by interference and/or congestion prior to channel assignment. Third, the channel switching may entail the use of a channel switching protocol that operates quickly to enable the wireless nodes that change channels to continue communicating shortly after the channel change. Fourth, a mechanism may be adopted for selecting a target channel.

These challenges are not addressed by any existing approach. Existing theoretical works commonly assume perfect MAC (i.e., no collisions due to perfect slot allocation). They also assume that a centralized controller has all the requisite information, which makes their theoretical algorithm difficult to apply in real-world deployments. Furthermore, existing distributed algorithms primarily address channel assignment issues as theoretical optimization problems; as a result, they fail to produce a practical solution that works on currently-commercialized hardware.

In contrast, certain implementations described herein can be employed on currently-commercialized hardware. For example, a described implementation entails a software module that can coordinate currently-commercialized hardware devices, such as network interface cards (NICs), at each wireless node for dynamic channel assignment and connectivity maintenance (CACM). However, CACM may generally be implemented in hardware, firmware, software, some combination thereof, and so forth.

Additionally, certain described implementations can address one or more of the above-identified challenges. For example, traffic information on the channel that a wireless node is operating on may be exchanged by broadcast between nodes to provide accurate and faster triggering for channel switching. Hence, traffic information on other channels can also be obtained through back-ground channel scanning. For channel assignment changes, a channel switching protocol is described that can provide synchronized channel switching. A mechanism is also described to maintain the connectivity between multiple, and up to all, nodes of a wireless ad hoc network, even when wireless nodes are currently working on different channels that are orthogonal.

Example Implementations for Dynamic Channel Assignment and Connectivity Maintenance in Wireless Networks 1. Example Environments Dynamic channel assignment and connectivity maintenance may be implemented in any general wireless network. However, an example wireless ad hoc network is illustrated in FIG. 1 and described below.

FIG. 1 is a block diagram illustrating an example of a wireless network environment 100. Wireless network 100 includes multiple wireless nodes 102. As illustrated, wireless network 100 includes "w" wireless nodes 102(1), 102(2), 102(3) ... 102(w), with "w" being some integer. Each wireless node 102 may be realized by, for example, an electronic device. An example device is described herein below with particular reference to FIG. 8.

Each wireless node 102 may be in wireless communication with one or more other wireless nodes 102 via at least one wireless communications link 106. To enable wireless communication, each wireless node 102 includes at least one radio 104. Although only one radio 104 is shown, each wireless node 102 may have any number of radios 104.

Each radio 104 enables a wireless node 102 to communicate on a wireless channel. Each radio is typically capable of communicating via links 106 in accordance with at least one wireless standard. Example wireless standards include, but are not limited to, IEEE 802.11a, IEEE 802.11b, IEEE 802.11g, other IEEE 802.11 standards, UWB, and so forth.

With current technology, each radio 104 is only capable of communicating on one channel at any given moment. To communicate on a second channel, a single radio 104 switches from a first channel. Consequently, a wireless node 102 having one radio 104 is capable of communicating on a single channel at any given moment.

2. Example General Implementations for CACM

Figure 2:
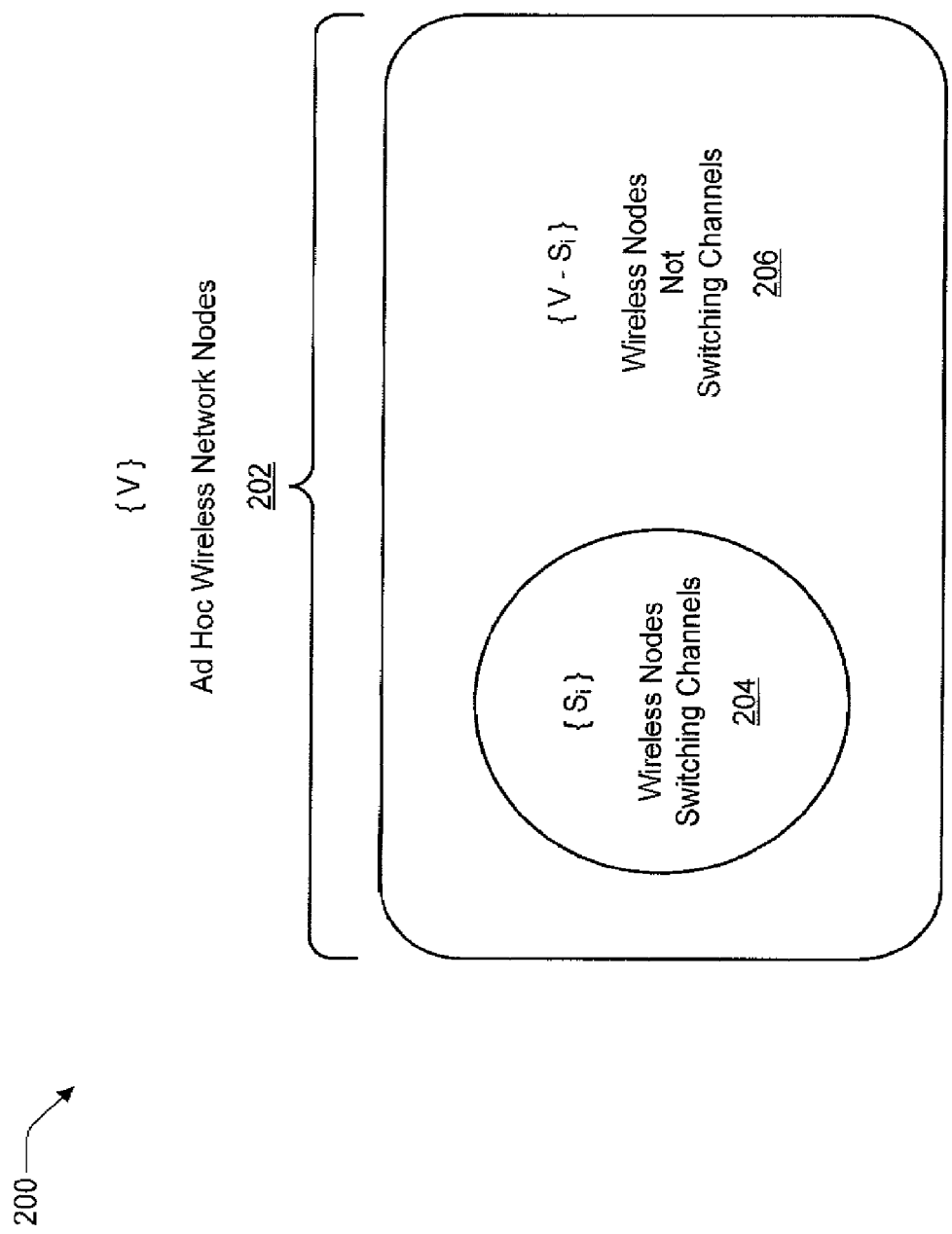
FIG. 2 is a block diagram illustrating an example of the establishment of virtual wireless networks from an ad hoc wireless network by selectively switching channels.
Figure 3:
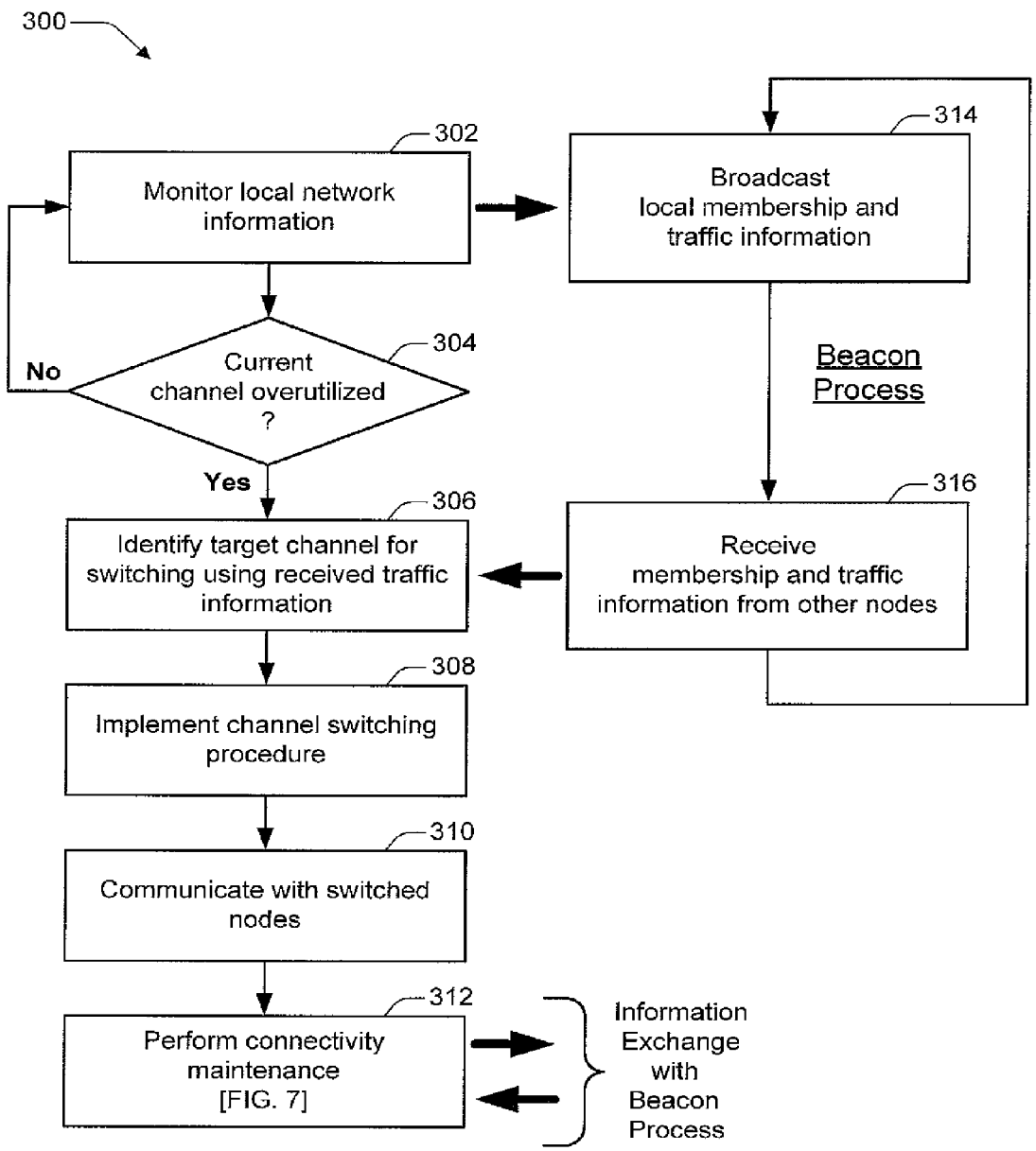
FIG. 3 is a flow diagram that illustrates an example of a method for dynamic channel assignment and connectivity maintenance in wireless networks.

In this section, example general implementations for dynamic channel assignment and connectivity maintenance in wireless networks are described. FIG. 2 illustrates an example of a virtual wireless network created when a subset of wireless nodes switch to a different channel. FIG. 3 illustrates a general example method for dynamic channel assignment and connectivity maintenance in wireless networks. Subsequent sections describe more specific implementations.

FIG. 2 is a block diagram illustrating an example of the establishment of virtual wireless networks from an ad hoc wireless network 200 by selectively switching channels. Ad hoc wireless network 200 illustrates a Venn diagram representation of a wireless network, such as wireless network 100 (of FIG. 1). The entire rectangular block 202 represents the entirety of the wireless nodes, labeled V, of the entire wireless ad hoc network. The entirety of the wireless network may be defined based on any given criteria, such as those nodes that are in range and originally operating on a single first channel, those nodes that have agreed to form an ad hoc wireless network, those nodes that are commonly-owned or managed, some combination thereof, and so forth.

When each node of a subset of the V nodes is to switch from a first channel to a second channel, this channel assignment creates two subsets of nodes that form two virtual wireless networks. These wireless nodes that are switching channels are represented by circle 204. These channel-switching nodes form a second virtual wireless network and are labeled $S_i$. The remaining wireless nodes that do not switch channels are represented by the remainder 206 of the rectangular block 202. These non-switching wireless nodes 206, which are labeled $(V-S_i)$, form a first virtual wireless network that continues on the original first channel of the wireless ad hoc network. It should be noted that reference numbers 202, 204, and 206 are used herein below to represent respective (sub) sets of wireless nodes and/or the respective (virtual) wireless networks formed by the wireless nodes.

Wireless nodes 204 may communicate on a second channel that is orthogonal to the first channel on which non-switching wireless nodes 206 continue to communicate. This enables the total wireless nodes 202 to communicate at a greater bandwidth because of the reduced interference and channel access contention and because the bandwidth of two channels are being utilized.

To create these two virtual wireless networks 204 and 206, wireless nodes 204 initially agree to jointly switch channels. Additionally, to maintain the overall network connectivity, all or a portion of wireless nodes 204 and/or wireless nodes 206 agree to switch to a common channel as appropriate to communicate packets there between. In fact, wireless nodes 204 and 206 may reform the overall wireless network 202 from time to time. These channel assignment changes to create virtual wireless networks and to maintain connectivity are described generally herein below with particular reference to FIG. 3.

More specific example implementations are described below in Sections 3 and 4. They entail, for example, a mechanism for triggering a channel switch and a mechanism for maintaining connectivity, which may be activated especially when an incoming communication is destined for a wireless node that is currently in a different virtual wireless network. In order to know which channels are available and which wireless nodes are on which channels, example implementations may include a network information broadcast mechanism. A channel switching protocol is also described.

FIG. 3 is a flow diagram 300 that illustrates an example of a method for dynamic channel assignment and connectivity maintenance in wireless networks. Flow diagram 300 includes eight (8) blocks. Although the actions of flow diagram 300 may be performed in other environments and with a variety of hardware, firmware, and software combinations, certain aspects of FIGS. 1-2 are used to illustrate an example of the method of flow diagram 300. For instance, the actions of flow diagram 300 may be performed individually by wireless nodes 102 of wireless networks 100 and 200.

In a described implementation, starting at block 302, local network information is monitored. For example, a wireless node 102 may monitor network information on a wireless channel on which the wireless node is currently operating. Network information may include, by way of example, but not limitation, membership information and traffic information. Network information is transmitted in a broadcast and received from other nodes in a beacon process of actions that are illustrated by block 314 and block 316, respectively.

At block 314, local membership information and traffic information are broadcast. For example, wireless node 102 may broadcast its node identification (ID) and its local traffic information. Other nodes may receive and process this traffic information. Meanwhile, these other nodes are likewise monitoring and broadcasting their own nodal IDs and traffic information. An example broadcast format and content is described herein below with particular reference to FIG. 5.

At block 316, membership information and traffic information from other nodes are received. For example, wireless node 102 may receive node IDs and traffic information, which has been observed by other nodes, and broadcast by them on their current channels. The actions of blocks 314 and 316 may be repeated by each wireless node 102 periodically.

At block 304, it is determined if a current wireless channel is over-utilized. For example, it may be determined if a channel on which wireless node 102 is currently operating is so busy as to be inefficient based on a predetermined threshold. If the current operational channel is not over-utilized, then the monitoring continues (at block 302). If, on the other hand, the current operational channel is over-utilized, then the method of flow diagram 300 continues at block 306.

At block 306, a targeted channel for switching is identified using received traffic information. For example, traffic information that is received from other nodes (at block 316) may be used to determine an orthogonal channel that is not currently over-utilized.

At block 308, a channel switching procedure is implemented. For example, a protocol enabling a subset of wireless nodes to switch channels may be implemented. An example channel switching protocol is described herein below with particular reference to FIG. 6.

At block 310, communication with the switched node(s) may commence. For example, with each of the nodes in the subset that is to form a new virtual private network agreeing to the channel assignment change, communication may commence shortly after the channel switch in accordance with the protocol of FIG. 6.

At block 312, a connectivity maintenance procedure may be performed. For example, a common channel may be established or reestablished between two or more nodes of at least two different virtual wireless networks. This procedure may be activated when, for example, communication between the two or more nodes is requested. Connectivity maintenance may be performed in conjunction with an exchange of information with the beacon process because the beacon process provides nodal IDs and the channels on which nodes are currently operating, as well as traffic information. An example connectivity maintenance procedure is described herein below with particular reference to flow diagram 700 of FIG. 7.

Examples of the actions of blocks 302, 304, and 306 are described in greater detail below in Section 4.1. Examples of the actions of blocks 314 and 316 are described in greater detail in Section 4.2. Examples of the actions of blocks 308 and 310 are described in greater detail in Section 4.3. And examples of the action(s) of block 312 are described with greater specificity in Section 4.4.

3. Example Architecture for CACM

In a described implementation for channel assignment and connectivity maintenance (CACM), channels are adaptively assigned to each node in a wireless ad hoc network. A CACM module may be located between a MAC layer and a routing layer.

Figure 4:
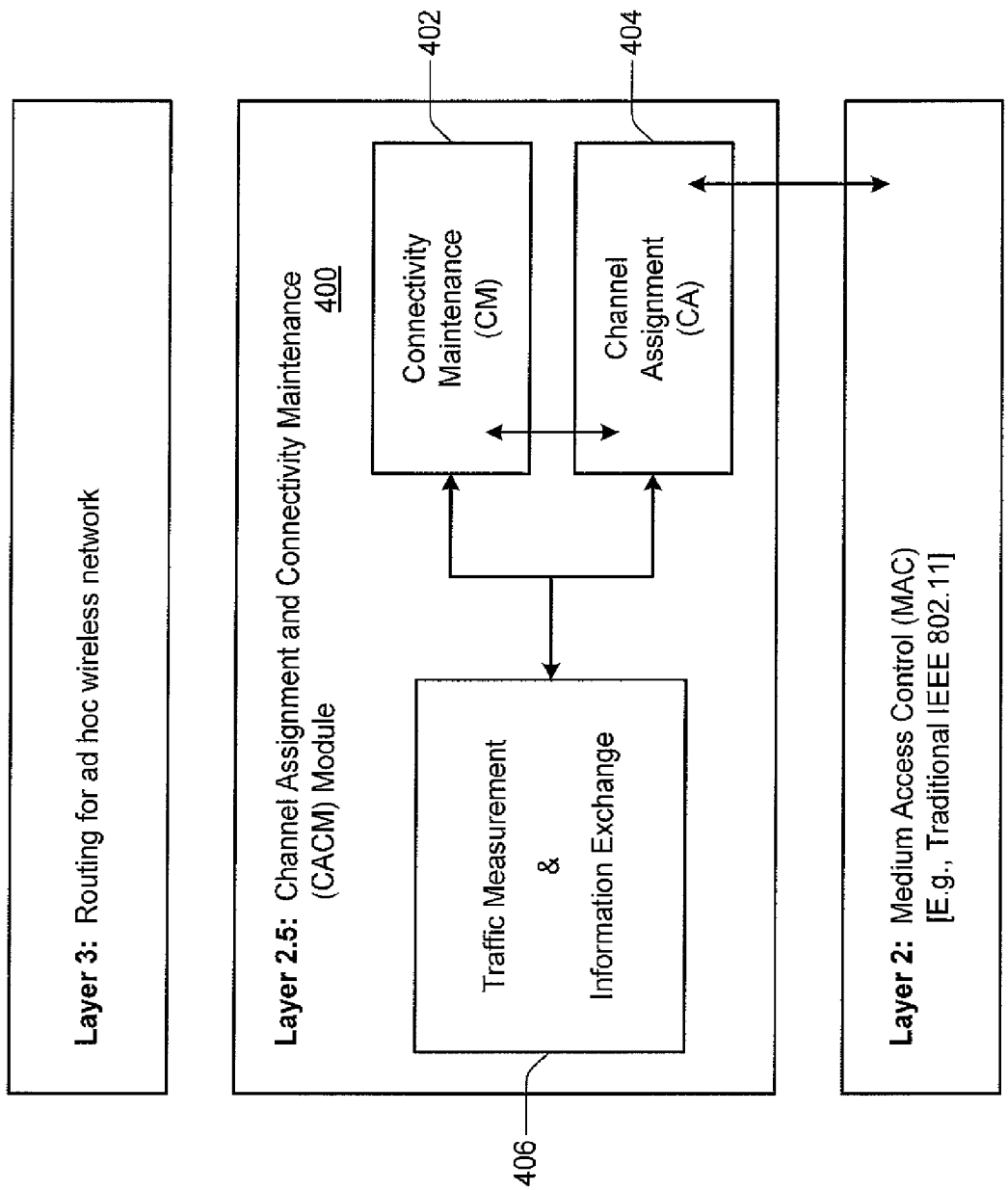
FIG. 4 is a block diagram of an example layer 2.5 channel assignment and connectivity maintenance (CACM) module shunted between layers 2 and 3 of a wireless network communications stack.

FIG. 4 is a block diagram of an example layer 2.5 CACM module shunted between layers 2 and 3 of a wireless network communications stack. Layer 3 is responsible for routing in an ad hoc wireless network. Layer 2 is responsible for medium access control (MAC) (e.g., as in a traditional IEEE 802.11 network). Locating the example CACM module 400 at Layer 2.5 can facilitate its interaction with off-the-shelf hardware (e.g., 802.11 DCF NIC).

As illustrated, the architecture of CACM module 400 includes three (3) modules 402-406. These three modules are: a connectivity maintenance (CM) module 402, a channel assignment (CA) module 404, and a traffic measurement & information exchange module 406. Channel assignment module 404 may communicate with the MAC Layer 2.

In a described implementation, mechanisms for CA and CM may operate as follows. For CA, nodes that have no active traffic connection are assigned to a different channel to reduce the interference and thereby improve the performance of the wireless ad hoc network. The nodes in an ad hoc network are intentionally separated into node subsets. The nodes belonging to one of the node subsets are moved to an orthogonal channel to reduce the interference between the node subsets. Dividing nodes into node subsets is described above in Section 2 with particular reference to FIG. 2 and below in Section 4.1.

When a new traffic request arrives (e.g., from a higher layer of the network stack) for a connection between two nodes that are currently in different node subsets and therefore on different channels, the CM functionality switches the node subsets to the same channel (or at least the two nodes that are to communicate). As a result of this merging of the subsets, each of the nodes in the ad hoc wireless network that has an active traffic connection is communicating on the same wireless channel. Because traffic requirements between nodes are dynamic, CA module 404 and CM module 402 can be operated dynamically and deployed in a distributed manner.

For an example implementation, operations for a CM module 402, a CA module 404, and a traffic measurement & information exchange module 406 are described. With regard to traffic measurement & information exchange module 406, each node measures the traffic rate (e.g., the bandwidth) to and from each of its neighbor nodes. It also explicitly exchanges its measured traffic information with its neighbors by broadcasting. The traffic information that is broadcasted from each node and that is received at each node is stored, and the active connectivity information can be deduced from the stored traffic information for the use with CA decisions.

With regard to CA module 404, each node periodically checks whether it should switch channels with other nodes. If so, it performs a corresponding channel switch under the protocol described in Section 4.3.

With regard to CM module 402, connectivity maintenance is provided by switching nodes that are on different channels to the same channel. In other words, two nodal subsets that are operating on different orthogonal channels may be merged into a set that is operating on a single channel.

Figure 5:
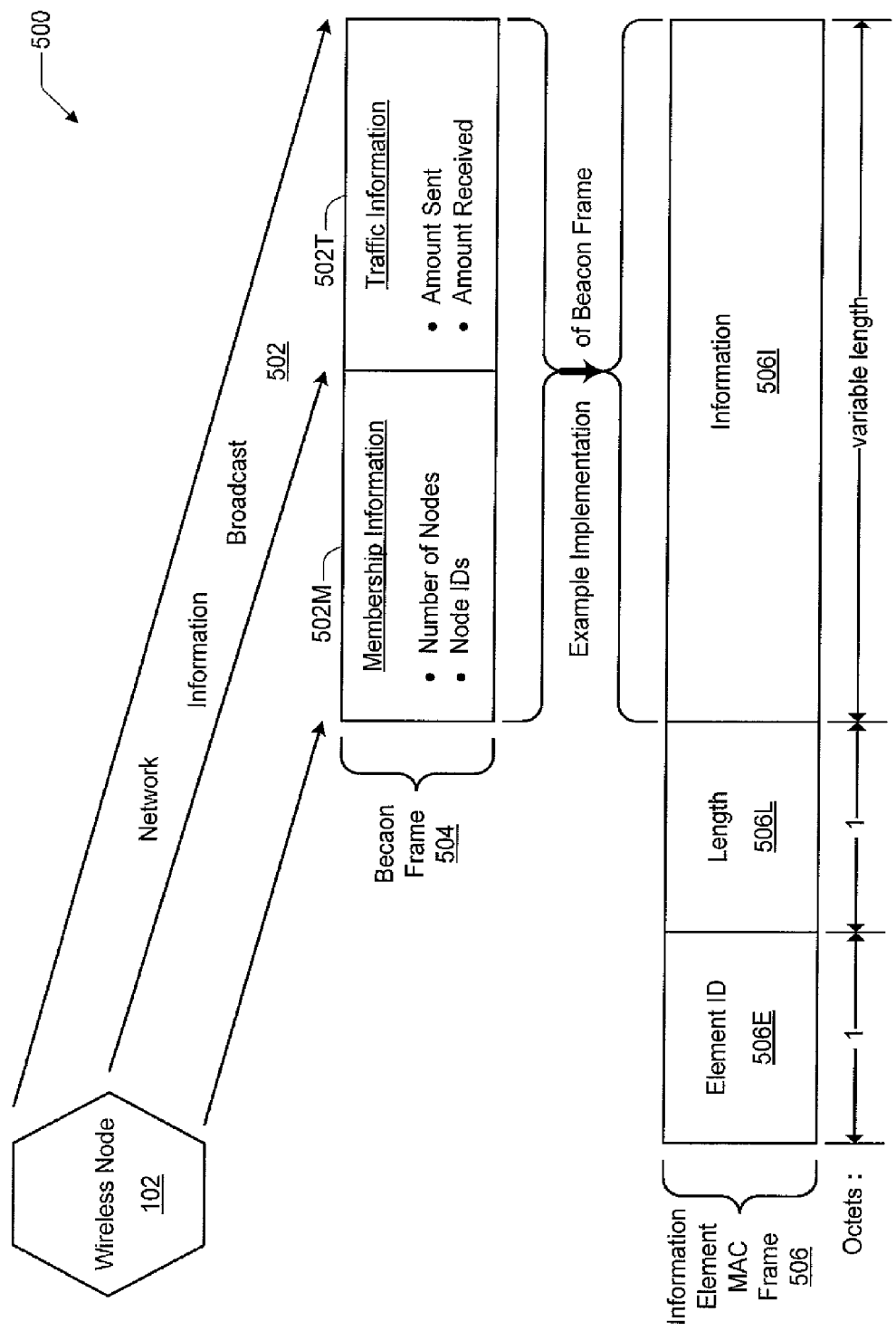
FIG. 5 is a block diagram illustrating the broadcasting of network information to facilitate the manipulation of virtual wireless networks with respect to an ad hoc wireless network.
Figure 6:
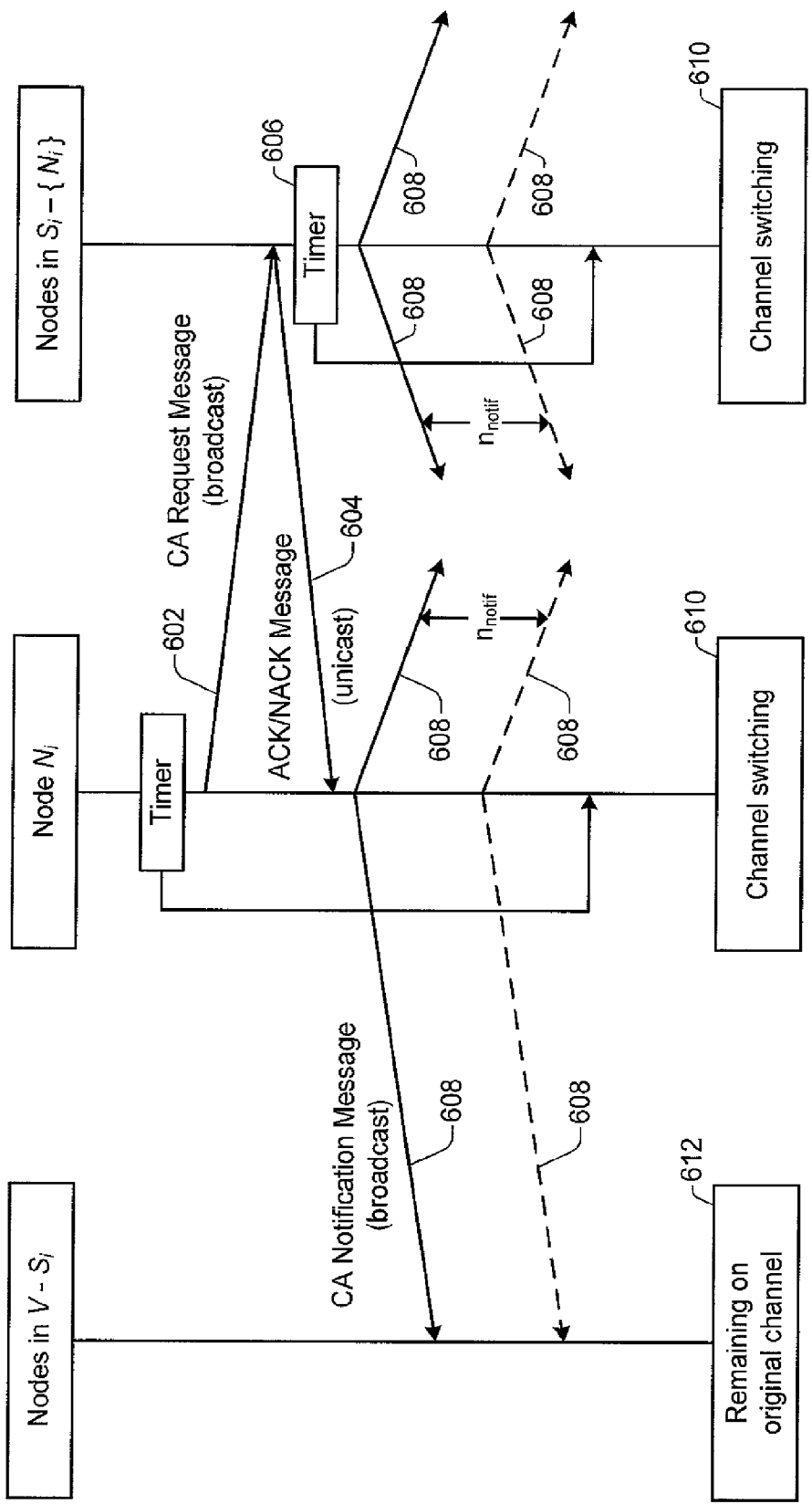
FIG. 6 is an example message sequence diagram among nodes in a wireless network for a channel switching operation protocol.

Because a channel assignment may be triggered many times (e.g., node sets may be divided into subsets many times) and connectivity maintenance may be activated many times (e.g., node subsets may be merged many times), it may become difficult or even impossible to track what channel each node has switched to based solely on notifications that may be issued at the time of a given channel change in accordance with the protocol of FIG. 6. An example implementation, as described herein below with particular reference to FIG. 5, involves a membership information identification mechanism in which wireless network subset information is broadcast.

4. Example Specific Implementations for CACM

In a described implementation an example CACM procedure may be described in four parts. The first three parts are performed at least partially in CA module 404. The fourth part is performed at least partially in CM module 402. Generally, each of the following four parts are involved in the distributed CACM algorithm at each wireless node:

1) A node (say node i) identifies that the current channel (say channel l) on which the node is communicating is over-utilized.

2) The node identifies a target channel (say channel l') and target nodes for channel reassignment by switching their channel together. The channel reassignment may be carried out especially if throughput is predicted to be improved.

3) The node starts a channel switching protocol with the target nodes and reconnects with them after the channel switching.

4) Connectivity maintenance is activated for the nodes that switch channels and the nodes that remain on the original channel.

4.1 Trigger for Channel Assignment

In a described implementation, the channel assignment is triggered when a node i senses that the current channel is over-utilized. Over-utilization indicates, for example, that traffic from other nodes is interfering with the communication for node i on the current channel. Initially, traffic information is collected and exchanged by broadcast. This broadcast is described below in Section 4.2 with particular reference to FIG. 5. For each node, traffic is measured from each neighbor node as well as to each neighbor node that is active.

Interference can therefore be determined by how much the percentage of interfering traffic affects the communication for node i. For example, the throughput ratio r for node i on channel l ($r_i^l$) can be used as the trigger for channel assignment. When $r_i^l$ is lower than a pre-defined threshold $Th_r$ (at node i on channel l), a CA procedure can be triggered.

The triggering throughput ratio $r_i$ is defined as the ratio of (i) the throughput achieved by node i and nodes that have active traffic connection(s) with node i over (ii) the whole throughput for each of the nodes that are active on channel l. The trigger can be written as:

$$r_i <= Th_r,$$

where $Th_r$ is the pre-defined threshold for triggering a channel switch. In an example implementation, a default value for $Th_r$ is 0.5; however, other values may alternatively be employed.

Because channel assignment involves some nodes switching to a different channel while leaving others on the current channel, network subsets are created. A first node subset includes the nodes that do not switch channels and that remain on the first or original channel. A second node subset includes the nodes that switch to the second or different channel.

Upon the channel switching, the connectivity between the two node subsets is broken, at least temporarily. Thus, for a described implementation, the two node subsets are defined such that there is no active traffic connection between any two respective nodes that are in different respective node subsets. A mechanism to maintain the connectivity between the two node subsets after channel switching is described below in Section 4.4 with particular reference to FIG. 7. Maintaining connectivity is particularly relevant when a traffic request arrives that is to bridge the two node subsets to be completed.

An example algorithm for triggering channel assignments is formally described below. For a general described implementation, however, a node subset is defined initially with respect to a given single node. Any node that is directly or indirectly part of an active traffic communication with this given node can form part of the second network subset $S_i$ (of FIG. 2). The other nodes in the network can form part of the first network subset $\{V-S_i\}$. If the traffic throughput rate of the second network subset relative to the total traffic rate throughout of the entire network V is sufficiently small, then the second network subset is switched to a different channel to create a second virtual network 204.

For a formal description of an example algorithm, assume there is a wireless ad hoc network with |V| number of nodes. Let V denote the set of the nodes. The nodes are numbered $N_1$, $N_2$ ... $N_{|V|}$. Each node is equipped with (at least) one wireless interface (e.g., a NIC) that is capable of communicating on multiple channels, but only one at a time. Assume the node that has the trigger is named node $N_i$ and that the node set $S_i$ contains the nodes that will switch channels with node $N_i$. The link from node $N_i$ to $N_j$ is denoted as link $l_{(i,j)}$, and the traffic rate on $l_{(i,j)}$ is denoted as $T_{(i,j)}$. If $T_{(i,j)} > 0$, then link $l_{(i,j)}$ is defined as active; otherwise, it is considered inactive.

For a described implementation, pseudo code for an example CACM trigger algorithm is provided below. If the returned value is a valid node set $S_i$, then node $N_i$ initiates a channel switching procedure. Otherwise, node $N_i$ ceases the current procedure when "FALSE" is returned.

```
Variable: node set S_i = {N_i}
1 Begin:
2 For each node N_j ∈ S_i
3    If (∃N_k ∈ V − S_i AND (T_(j,k) > 0 OR T_(k,j) > 0))
4        { S_i = S_i∪{N_k}; go to Begin;}
5 Let T_S_i (T_V) be the total traffic rate in node set S_i(V)
6    r_i = T_S_i | T_V
7    If r_i < Th_r, return S_i;
8 return FALSE;
```

With respect to the pseudo code above, the routine is initialized by setting the node subset $S_i$ to include node $N_i$. Lines 1-4 define the (potential) second subset of nodes $S_i$. Generally, each node in the network that has traffic with node $N_i$ or with another node that has traffic with $N_i$ is added to subset $S_i$. The connectivity chain may be extended in this manner until each node throughout the network is checked for whether it is to be included withing subset $S_i$. Lines 5-7 ascertain a ratio of the traffic rate $T_S$ of the subset $S_i$ to the total traffic rate $T_V$ of the entire network V. This traffic ratio $r_i$ is compared to a trigger threshold $Th_r$ to determine whether a channel assignment is to occur.

4.2 Target Channel Selection

The target channel for channel assignment is selected. To do so, traffic information on other channels is first collected. One possible approach is to scan the other channels and join whatever network is found. However, joining a network costs time and involves additional signaling message exchanges. Instead, traffic information may be collected, and exchanged, using beacons broadcast by individual nodes.

In a described implementation, each node continuously performs a back-ground scan on each channel to collect traffic information on other channels. When a given node is connected to other nodes on one channel, the given node can still scan other channels to find other nodes. When performing a scan, the given node can obtain network information from the other nodes that are found on the other channels by receiving a beacon frame from the other nodes. Alternatively, a given node may send a probe frame and then receive a corresponding response frame that has the network information.

FIG. 5 is a block diagram 500 illustrating the broadcasting of network information 502 to facilitate the manipulation of virtual wireless networks with respect to an ad hoc wireless network. The manipulation may include the creation, the modification, the merging, etc. of virtual wireless networks. As illustrated, a wireless node 102 is broadcasting network information 502 in a beacon frame 504.

In a described implementation, network information 502 includes at least membership information 502M and traffic information 502T. Membership information 502M may include, by way of example but not limitation, node identifications (IDs) and a total number of nodes. Node IDs may be names, numbers, hash values, and so forth. Traffic information 502T may include, by way of example but not limitation, the amount of traffic that is sent (outgoing traffic) and/or the amount of traffic that is received (incoming traffic). The amount of traffic may be specified in terms of packets per unit of time, bits per unit of time, and so forth. Traffic information 502T may also indicate a traffic type or types (e.g., TCP, UDP, etc.).

Network information 502 is broadcast by each wireless node 102 in a beacon frame 504. Hence, each node collects network information 502 on a per-channel basis. The nodal distance of network information 502 that is measured or otherwise acquired by each node may be set to any level. However, for a described one-hop implementation, each node collects and then broadcasts network information 502 for a nodal distance of one hop.

Beacon frame 504 may be implemented in any manner in any wireless network that is operating in accordance with any wireless standard. However, for a described implementation, beacon frame 504 may be implemented in a wireless ad hoc network that is operating in accordance with an IEEE 802.11 standard. In an example IEEE 802.11 implementation, beacon frame 504 is implemented as part of an Information Element MAC frame 506.

As illustrated, Information Element MAC frame 506 includes three portions: element ID 506E, length 506L, and information 506I. Example sizes of each portion are shown on FIG. 5. Both element ID 506E and length 506L are one octet in length. Element ID 506E contains an identifier for the type of Information Element MAC frame 506. Length 506L contains a variable indicating the length of Information 506I. Membership information 502M and/or traffic information 502T can be placed in Information 506I.

More specifically, when a node is connected to some other nodes on one channel, IEEE 802.11 standards define that a node can scan other channels to find other nodes. In the 802.11 MAC, a field named Information Element (IE) is defined for a Beacon and Response frame. The format is represented by Information Element MAC frame 506. The traffic information and/or the membership information for the current channel may be piggy-backed in the IE field of the beacon and response frame. Consequently, other nodes can obtain such information when they perform a standardized scan procedure.

Regardless of which wireless standard is being followed, beacon frame 504 may be broadcast by wireless node 102. Beacon frame 504 contains network information 502, which includes membership information 502M and/or traffic information 502T. Thus, a node can use the traffic information obtained from a back-ground scan to select the least busy channel as the target channel for channel switching.

4.3 Channel Switching Protocol

An example operation for channel switching negotiation is described. It is applicable when a node $N_i$ determines that a channel assignment change is to be attempted, as is described herein above in Section 4.1.

FIG. 6 is an example message sequence diagram 600 among nodes in a wireless network for a channel switching operation protocol. The nodes include node $N_i$ and the nodes of $\{S_i - N_i\}$, which Jointly represent the wireless nodes switching channels 204 (of FIG. 2). The nodes also include those in $\{V - S_i\}$, which represents the wireless nodes that are not changing channels 206.

If node $N_i$ decides to switch channels with a set of nodes, namely $S_i - \{N_i\}$, it sends a CA request message 602 to $S_i - \{N_i\}$ by broadcast. CA request message 602 indicates that node $N_i$ wishes to switch channels from l to l' and expects the nodes in $S_i - \{N_i\}$ to follow, thereby switching together. Each node $N_j$ provides feedback via uni-cast with an ACK/NACK message 604 to confirm/reject the switching request. If the result is a NACK message or no feedback is received at node $N_i$ after a timeout, then node $N_i$ regards the channel switching request as having failed for a node $N_j$.

Otherwise, both node $N_i$ and the nodes in $S_i - \{N_i\}$ start a timer 606 for channel switching and broadcast a CA notification message 608. CA notification message 608 is broadcast $n_{notf}$ times toward their neighbor nodes. CA notification message 608 is broadcast $n_{notf}$ times so as to ensure that the message will be successfully received with a high probability. Although it may be set to any number, a described implementation sets $n_{notf}$ to be 3 so that the message is broadcast three times. After CA notification message 608 is broadcast the selected number of times, the nodes of $S_i$, including node $N_i$, switch channels 610 from channel l to channel l'. The nodes in $\{V-S_i\}$, on the other hand, remain on the original channel 612.

4.4 Connectivity Maintenance

When a subset of nodes has switched channels, overall network connectivity is broken, at least temporarily. From time to time, this connectivity may need to be reestablished. To handle these situations, connectivity maintenance is activated.

Whenever a node, say node $N_i$, receives a packet from a higher protocol stack layer with a destination node, say node $N_j$, that has switched channels with some other nodes, the connectivity between nodes $N_i$ and $N_j$ still needs to be maintained. Hence, node $N_i$ is to locate node $N_j$ in order to deliver the packet. A possible, straightforward approach to locate node $N_j$ is for node $N_i$ to scan all of the channels, join whatever network it detects, and then send some signaling message packet(s) to query the existence of node $N_j$. However, this straightforward approach is time intensive because, besides the time for scanning, it requires additional time for joining a network and for exchanging messages.

In contrast, for a described implementation, network information 502 that is broadcast on beacon frame 504 is utilized to locate the destination node. A node $N_i$ with a packet to be transmitted to a destination node $N_j$ listens for network information 502 that are broadcast from other nodes. Hence, node $N_i$ can verify whether destination node $N_j$, is in a particular virtual ad hoc wireless network without joining it and without sending additional probe packets.

Figure 7:
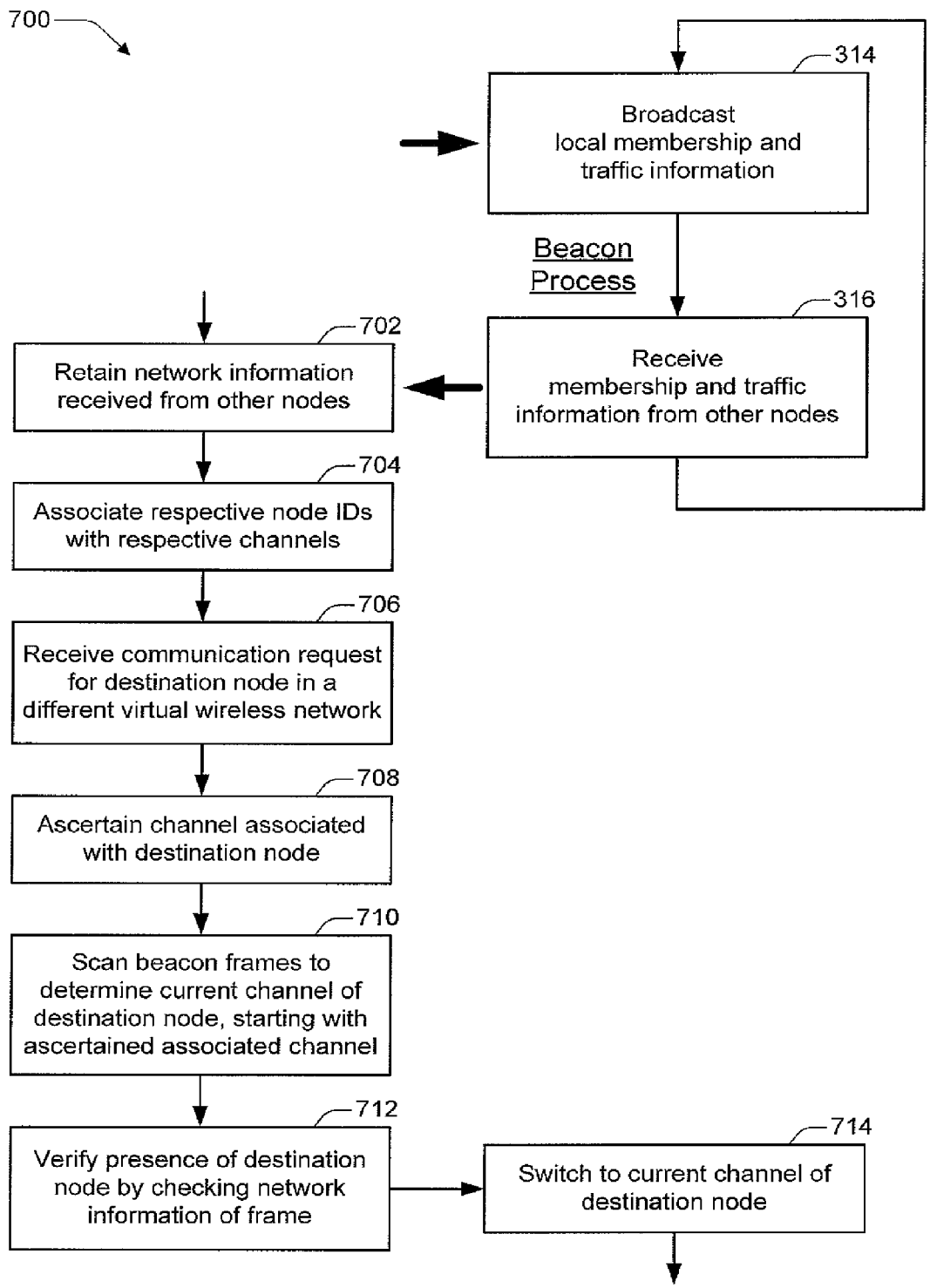
FIG. 7 is a flow diagram that illustrates an example of a method for maintaining connectivity in an ad hoc wireless network that establishes virtual wireless networks.

FIG. 7 is a flow diagram 700 that illustrates an example of a method for maintaining connectivity in an ad hoc wireless network that establishes virtual wireless networks. Flow diagram 700 includes seven (7) blocks 702-714 plus blocks 314 and 316 that are reproduced from flow diagram 300. Although the actions of flow diagram 700 may be performed in other environments and with a variety of hardware, firmware, and software combinations, certain aspects of FIGS. 1-6 are used to illustrate an example of the connectivity maintenance method of flow diagram 700.

For example, the actions of flow diagram 700 may be performed by a wireless node 102 in conjunction with network information 502 of a beacon frame 504. Additionally, the beacon process of blocks 314 and 316 is considered to be functioning concurrently. In this connectivity maintenance procedure example, assume a node $N_i$ is trying to locate a node $N_j$.

In a described implementation, starting at block 702, a wireless node retains network information that is received from other nodes. For example, the wireless node $N_i$ may receive membership information and traffic information from other nodes as part of the beacon process. In other words, each node, including node $N_j$, encodes the network information it has detected on its current channel in a beacon frame. For an example IEEE 802.11 implementation, the IE field of a Beacon and Response frame may be used.

More specifically, wireless node 102 may receive on a particular channel at least one beacon frame 504 that includes network information 502 that is broadcast from another wireless node 102. As part of membership information 502M, wireless node 102 collects node IDs.

At block 704, the wireless node associates respective node IDs with respective channels. For example, wireless node 102 may associate respective ones of the collected node IDs with the respective particular channels on which beacon frames 504 were received. The associations may be stored in, for example, a table or other data structure.

At block 706, the wireless node receives a communication request for a destination node that is in a different virtual wireless network. For example, a node in virtual wireless network 204 may receive a communication for a destination node that is in virtual wireless network 206.

At block 708, the wireless node ascertains the channel that is associated with the destination node. For example, wireless node 102 may access a table to locate an entry including the node ID of the destination node. The associated channel may be retrieved from the table by extracting it from the entry.

At block 710, the wireless node scans beacon frames to determine the current channel of the destination node, starting with the ascertained associated channel. For example, wireless node 102 may scan each of the channels that it is capable of receiving transmissions on given its specific radio 104 and the relevant wireless communications standard under which it is operating.

By way of example only, for an IEEE 802.11 implementation, node $N_i$ may perform a standardized scan as defined in the IEEE 802.11 MAC. It is likely faster to first scan the channel that was obtained by node $N_i$ from overhearing node $N_j$'s broadcast indicating its target channel assignment because there is a high probability that $N_j$ is still on the indicated channel.

At block 712, the wireless node verifies the presence of the destination node by checking network information included in a frame. For example, the frame may be a beacon frame 504 or a response frame from a transmitted probe.

By way of example only, for an IEEE 802.11 implementation, the existence of node $N_j$ may be verified by checking the IE field received by a Beacon frame or a Response frame on any channel that node $N_i$ has scanned. The node $N_i$ may receive multiple valid IEs that contain such information, especially when node $N_j$ has recently switched channels and the outdated information has not yet been updated. In these cases, the network information having the largest timestamp value may be selected. The timestamp can be obtained by letting node $N_j$ encode its own value into its IE field, or a MAC frame timestamp may be used.

At block 714, the wireless node switches to the current channel of the destination node. For example, wireless node 102 may individually switch to the other virtual wireless network or it may implement a channel switching procedure 600 to have each of the nodes in its virtual wireless network change channels to the current channel of the destination node. Alternatively, the node $N_i$ may ask the node $N_j$ to switch to its current channel.

5. Example Device Implementations

FIG. 8 is a block diagram of an example device 802 that may be used to implement dynamic channel assignment and connectivity maintenance in wireless networks. Multiple devices 802 are capable of forming and communicating over one or more networks 100 (of FIG. 1). Hence, wireless nodes 102 may be realized as devices 802. Network 100 may be any network or portion thereof that is formed at least partially of wireless nodes 102. Thus, network 100 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, some combination thereof, and so forth.

As illustrated, two devices 802(1) and 802(n) are capable of engaging in message communication transmissions via network 100. Message communications include, by way of example but not limitation, the exchange of wireless network parameters (e.g., by broadcast or specific inquiry), interactions to effectuate a channel assignment switching operation with a subset of nodes, and so forth. Although two devices 802 are specifically shown, one or more than two devices 802 may be employed, depending on implementation.

Generally, a device 802 may represent any computer or processing-capable device, such as a server device; a workstation or other general computer device; a data storage repository apparatus; a personal digital assistant (PDA); a mobile phone; a gaming platform; an entertainment device; a router computing node; a mesh network node, some combination thereof; and so forth. As illustrated, device 802 includes one or more input/output (I/O) interfaces 804, at least one processor 806, and one or more media 808. Media 808 include processor-executable instructions 810.

In a described implementation of device 802, I/O interfaces 804 may include (i) a network interface for communicating across network 100, (ii) a display device interface for displaying information on a display screen, (iii) one or more man-machine interfaces, and so forth. Examples of (i) network interfaces include a network card, a modem, one or more ports, a network communications stack, a radio 104, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 812 (e.g., a keyboard, a remote, a mouse or other graphical pointing device, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802.

Thus, realizations for dynamic channel assignment and connectivity maintenance in wireless networks may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Media 808 may be any available media that is included as part of and/or accessible by device 802. It includes volatile and non-volatile media, removable and non-removable media, and storage and transmission media (e.g., wireless or wired communication channels). For example, media 808 may include an array of disks or flash memory for longer-term mass storage of processor-executable instructions 810, random access memory (RAM) for shorter-term storing of instructions that are currently being executed and/or otherwise processed, link(s) on network 100 for transmitting communications, and so forth.

As specifically illustrated, media 808 comprises at least processor-executable instructions 810. Generally, processor-executable instructions 810, when executed by processor 806, enable device 802 to perform the various functions described herein. Such functions include, but are not limited to: (i) those actions that are illustrated in flow diagrams 300 and 700 (of FIGS. 3 and 7); (ii) the transmitting, receiving, processing, etc. of those messages that are illustrated in FIG. 6; (iii) realizing the Layer 2.5 CACM module 400 that is illustrated in FIG. 4; and so forth.

The devices, actions, aspects, features, functions, procedures, modules, data structures, protocols, wireless nodes, messages, etc. of FIGS. 1-8 are illustrated in diagrams that are divided into multiple blocks. However, the order, interconnections, interrelationships, layout, etc. in which FIGS. 1-8 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for dynamic channel assignment and connectivity maintenance in wireless networks.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device that is capable of functioning as a wireless node in a wireless ad hoc network, the device comprising:
    a traffic measurement and information exchange module to collect network information and to retain network information received via beacon broadcasts from one or more other wireless nodes, the network information including node identifications (IDs), wherein to retain network information comprises associating respective node IDs with respective channels in a data structure in accordance with the collected network information and channels on which the beacon broadcasts were received;
    a channel assignment module to create a virtual wireless network by separating a subset of wireless nodes from the wireless ad hoc network by switching from a current channel to another channel, wherein the channel assignment module retrieves the another channel from the data structure; and
    a connectivity maintenance module to merge the virtual wireless network into the wireless ad hoc network using the network information when a communication is for a destination wireless node that is not among the subset of wireless nodes in the virtual wireless network.

2. The device as recited in claim 1, wherein the channel assignment module is to select a target channel for the channel switching using the network information when a traffic-based ratio is triggered by a predetermined threshold.

3. The device as recited in claim 1, wherein the channel assignment module is to ascertain which wireless nodes are to be invited into the subset of wireless nodes by determining which other wireless nodes in the wireless ad hoc network are directly or indirectly actively communicating with the wireless node.

4. The device as recited in claim 3, wherein the channel assignment module is to initiate a channel switching procedure by broadcasting a channel assignment request message to the wireless nodes that are to be invited into the subset of wireless nodes.

5. The device as recited in claim 1, wherein the traffic measurement and information exchange module is to broadcast at least a portion of the network information in a beacon frame.

6. The device as recited in claim 5, wherein the device is capable of functioning as a wireless node in accordance with at least one IEEE 802.11 wireless network standard; and wherein the beacon frame comprises an information element frame.

7. The device as recited in claim 1, wherein the network information comprises membership information and traffic information; and wherein the member ship information includes multiple node identifications (IDs), and the traffic information includes incoming traffic and outgoing traffic.

8. The device as recited in claim 7, wherein the connectivity maintenance module is to locate a current channel of the destination wireless node using the multiple node IDs collected by the traffic measurement and information exchange module.

9. One or more processor-accessible media including processor-executable instructions that, when executed, direct a device to perform actions comprising:
    receiving a communication request at the device, the device functioning as a wireless node in a first virtual wireless network, wherein the communication request is for a destination wireless node that is functioning in a second virtual wireless network, the first and second virtual wireless networks operating on different channels;
    retaining network information received via beacon broadcasts from other wireless nodes, the network information including node identifications (IDs);
    associating respective node IDs with respective channels in a data structure in accordance with the received network information and channels on which the beacon broadcasts were received;
    ascertaining an expected channel on which the destination wireless node is expected to be operating, wherein the ascertaining comprises retrieving the expected channel from the data structure; and
    starting with the expected channel, scanning beacon frames on available channels to determine a current channel of the destination wireless node.

10. The one or more processor-accessible media as recited in claim 9, wherein the first and second virtual wireless networks jointly comprise at least part of an ad hoc wireless network; wherein the first virtual wireless network operates on a first channel, and the second virtual wireless network operates on a second channel; wherein the first channel is orthogonal to the second channel; and wherein the first and second channels are defined by a single wireless network standard.

11. The one or more processor-accessible media as recited in claim 9, wherein the processor-executable instructions, when executed, direct the device to perform further actions comprising:
    verifying that the destination wireless node is present on the current channel by checking network information from a received frame; and
    if the verifying is successful, switching to the current channel of the destination wireless node.

12. The one or more processor-accessible media as recited in claim 11, wherein the received frame comprises at least one of a beacon frame or a response frame from a probe.

13. The one or more processor-accessible media as recited in claim 9, wherein the action of ascertaining comprises retrieving the expected channel from stored network information previously received in a channel assignment notification message that was broadcast from the destination wireless node.

14. A method for a wireless node functioning in an ad hoc wireless network, the method comprising:
    monitoring local network information on a current channel;
    broadcasting the local network information from the wireless node on the current channel;
    receiving other network information from one or more other wireless nodes;
    determining when the current channel is over-utilized based on the local network information and the other network information, wherein the determining comprises:
        ascertaining a first traffic rate for a first subset of wireless nodes using at least the local network information;
        ascertaining a second traffic rate for a second subset of wireless nodes using at least the other network information;
        calculating a traffic ratio responsive to the first traffic rate and a total of the first and second traffic rates; and
        comparing the traffic ratio to a predetermined trigger threshold; and
    when the current channel is determined to be over-utilized, implementing a channel switching procedure to change from the current channel to a different channel.

15. The method as recited in claim 14, wherein the broadcasting comprises:
    broadcasting membership information including node identifications (IDs) and traffic information including incoming and outgoing traffic with respect to neighbor nodes.

16. The method as recited in claim 14, wherein the broadcasting and the receiving are part of a beacon process in the ad hoc wireless network, the beacon process including transmission and reception of an information element frame in accordance with an IEEE 802.11 wireless standard.

17. The method as recited in claim 14, wherein the receiving comprises:
    receiving the other network information from the other wireless nodes on one or more channels that differ from the current channel;
    wherein the method further comprises:
    identifying the different channel that is a target for the channel switching procedure using the other network information that is received on the one or more channels that differ from the current channel.

18. The method as recited in claim 14, wherein the ad hoc wireless network comprises at least a first subset of wireless nodes and a second subset of wireless nodes, the second subset including the wireless node implementing the channel switching procedure; and wherein the implementing comprises:
    switching the second subset to the different channel while the first subset remains on the current channel;
    wherein the method further comprises:
    performing connectivity maintenance to ensure a communication for a first node in the first subset can be sent from the wireless node implementing the channel switching procedure to the first node, performance of the connectivity maintenance including a channel assignment to switch the wireless node and the first node to a common channel.

* * * * *